Oct. 12, 1937.   G. M. SMITH ET AL   2,095,295
ELECTRIC RESISTANCE WELDING
Filed June 29, 1936
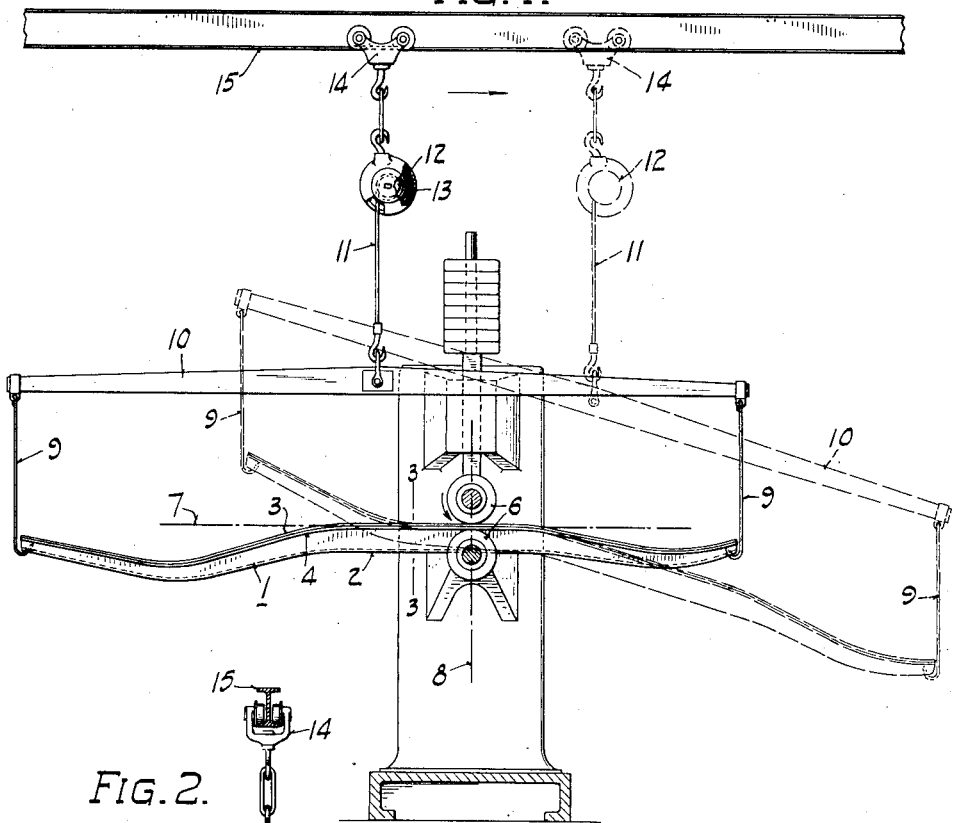
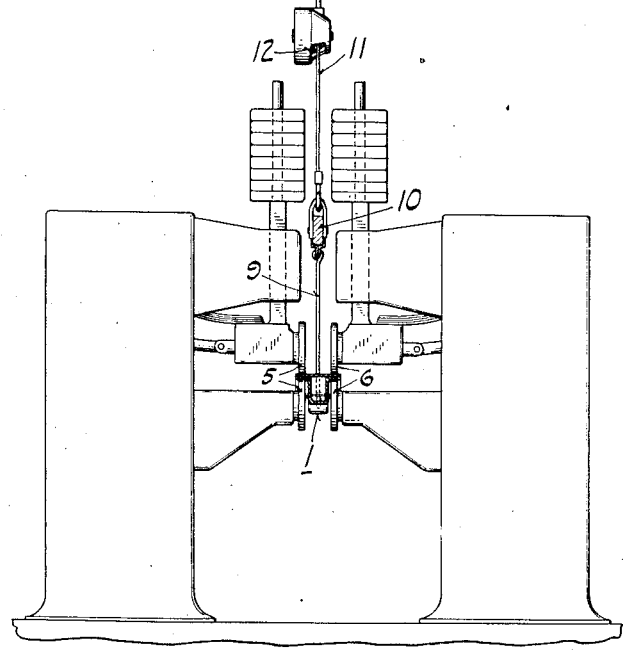
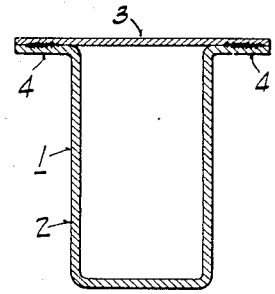
Inventors:
George M. Smith
Otto F. Rendenbach
Warren F. Heineman
John H. Crider.
BY
ATTORNEY.

Patented Oct. 12, 1937

2,095,295

UNITED STATES PATENT OFFICE 2,095,295

ELECTRIC RESISTANCE WELDING

George M. Smith, Milwaukee, and Otto F. Rendenbach and Warren F. Heineman, Shorewood, and John H. Crider, Milwaukee, Wis., assignors to A. O. Smith Corporation, Milwaukee, Wis., a corporation of New York Application June 29, 1936, Serial No. 87,930

7 Claims. (Cl. 219—10)

The invention relates to electric resistance welding and has been applied to the welding of side rails for automobile frames.

The side rails are tubular and are formed from flanged channel members and cover plates extending across the open sides of the members and welded to the flanges. In welding a cover plate to the flanges of a channel member two sets of electrode rolls are employed, one for each side of the cover plate, and the side rail is transmitted longitudinally between the rolls. The welding may be either continuous or intermittent.

In welding the cover plate to the flanges of the channel member it has been difficult to produce good welds uniformly throughout the length of the side rail due to the longitudinal curvature of the side rail and the consequent varying angles of the cover plate and flanges as they move through between the electrode rolls. Attempts have been made by the use of costly equipment to swing the side rail to keep the cover plate and flange as it passes between the rolls normal to a straight line connecting the axes of the rolls. These attempts have been unsuccessful heretofore since they have introduced additional variables which affected the quality of the welds.

The object of the present invention is to obtain a uniform quality of weld within permissible tolerances throughout the length of a curved article.

Other objects will appear hereinafter.

The accompanying drawing illustrates one embodiment of the invention, it being understood that the invention is susceptible to various embodiments. In the drawing:

Figure 1 is a schematic side elevation of the apparatus partly in section;

Fig. 2 is a similar front elevation of the apparatus, parts being shown in section; and Fig. 3 is a section taken on line 3—3 of Fig. 1 showing the construction of the side rail.

The side rail 1, which is being welded as illustrated, comprises a lower channel member 2 and an upper cover plate 3. The upwardly extending sides of the channel member have outwardly turned flanges 4 to which the cover plate 3 is being welded. The side rail 1 is curved at different points in its length as required in service.

The welding is done by means of a pair of electrode rolls 5 on one side of the channel and a similar pair of electrode rolls 6 on the other side of the channel, each pair of electrode rolls engaging the respective flange and associated edge portion of the cover plate. The pairs of rolls 5 and 6 are arranged side by side so that both flanges 4 are welded to the cover plate 3 simultaneously as the side rail 1 passes through the welding machine. The electrodes 5 and also electrodes 6 are pressed together with a pressure of about 900 pounds to apply pressure to the parts during welding. A suitable source of welding current is connected to the electrodes for supplying impulses of current for intermittently welding the parts as the side rail passes through the machine.

If the side rail 1 were passed horizontally through the electrodes an unsatisfactory weld would result due to the fact that the longitudinal line of the parts, at the curved portions of the side rail would not be normal to a straight line connecting the axes of the electrode rolls. If the longitudinal tangent line 7 of the flange 4 and cover plate 3 at the point where the straight line 8 between the axes of the electrode rolls intersects the meeting plane of flange 4 and cover plate 3 is not normal to line 8 or within a reasonable tolerance variation from normal, the welding characteristics become so altered as to tend to result in poor welds.

The present invention is based upon the discovery that wholly satisfactory welds may be obtained with a given weight of side rail and electrode pressure where the variation of line 7 from normal to line 8 does not exceed that produced by the weight of a predetermined length of side rail being passed freely through the electrode rolls 5 and 6. In other words, the pressure on the electrode rolls was found to be sufficient to support a given length of side rail within the tolerance variance from normal welding position as above pointed out.

The problem was then solved by providing a support for the entire side rail which would relieve the electrode rolls of the weight of the side rails and at the same time allow the side rails to be freely moved into normal position at all times relative to the electrode rolls by utilizing solely the pressure between the electrodes. The attempt was to make the side rail freely floating in air so that the electrode rolls 5 and 6 would swing the side rail to different angular positions and maintain tangent line 7 substantially normal to line 8 for all positions of the side rail during its passage between the rolls.

This was accomplished by tack welding or clamping the cover plate in place and suspending the side rail 1 from its ends by hooks 9 hanging from the ends of a light beam 10. The beam 10 was pivotally suspended at its center by a cable 11 from an eccentric drum 12, the rotation of which is opposed by a spring 13 of varying strength to maintain the supporting tension on cable 11 substantially constant within limits of up and down movements of the cable following tipping and raising and lowering of the side rail 1 as it passes through the electrode rolls 5 and 6. The drum 12 is suspended from a trolley 14 and an endless track 15, only a portion of which is shown, and which is provided for allowing free longitudinal movement of the side rail 1 through the electrodes and return of the suspending mechanism to starting position.

Figure 1 illustrates different positions of the suspending device and side rail as the latter passes through the electrode rolls, one position being shown in full lines and the other in dotted lines. It will be noted that the line 7 is maintained substantially normal to line 8.

In carrying out the invention it was found that the inertia and momentum in swinging the side rail to different angular positions and the friction of the support did not exceed in equivalency the weight of a given length of side rail and therefore the pressure on the welding rolls could maintain the required tolerance for good welding. The pressure between the welding rolls depends upon the requirement of the given welding operation.

The invention may have various embodiments within the scope of the accompanying claims.

We claim:

1. The method of electric resistance welding irregularly curved overlapping edges nested together, which comprises freely supporting the parts to be welded in a manner allowing the article to freely float relative to the welding rolls, passing the article while thus supported between resistance welding electrode rolls, and maintaining a predetermined welding pressure upon said rolls.

2. The method of electric resistance welding overlapping edges of a curved metal article, which comprises freely supporting the parts to be welded in a manner allowing the article to freely float relative to the welding rolls, passing the article while thus supported between resistance welding electrode rolls, and maintaining a predetermined welding pressure upon said rolls to effect angular tipping of the article according to its curvature and maintain the longitudinal tangent line of its meeting surfaces being welded substantially normal to a straight line connecting the axes of the electrode rolls.

3. In electric resistance welding of irregularly curved metal articles, the steps of applying roll electrodes to overlapping portions of the parts being welded, and maintaining the longitudinal tangent line of the meeting surfaces being welded substantially normal to a straight line connecting the axes of said electrodes as said parts are passed progressively between the electrodes.

4. In combination in apparatus for electric resistance welding a curved metal article, a pair of resistance electrode rolls to be applied under pressure to opposite sides of overlapping parts of the article, and means for supporting the article in a manner allowing free movement of the article to different angular positions under the electrode pressure.

5. In combination in apparatus for electric resistance welding an irregularly curved metal article, a pair of resistance electrode rolls to be applied to opposite sides of overlapping parts of the article, and means to maintain the longitudinal tangent line of the parts being welded at the electrode rolls substantially normal to a straight line connecting the axes of said electrodes as said parts are passed progressively between the electrodes.

6. The method of electric resistance welding overlapping edges of a metal article, which comprises supporting the article in a balanced hanger to allow the article to freely float relative to the welding electrodes, and passing the edges between welding electrodes under pressure to maintain the longitudinal tangent line of the parts at the electrodes substantially normal to a straight line connecting the axes of said electrodes.

7. The method of electric resistance welding a metal article, which comprises supporting the article in a hanger to allow the article to tilt to different positions, passing the edges to be welded between welding electrodes, and pressing said electrodes together to maintain the longitudinal tangent line of the parts at the electrodes substantially normal to a medial line connecting the electrodes.

GEORGE M. SMITH.
OTTO F. RENDENBACH.
WARREN F. HEINEMAN.
JOHN H. CRIDER.